No. 885,059. PATENTED APR. 21, 1908.
J. B. LAURSEN.
INDICATOR FOR TANKS.
APPLICATION FILED APR. 11, 1907.
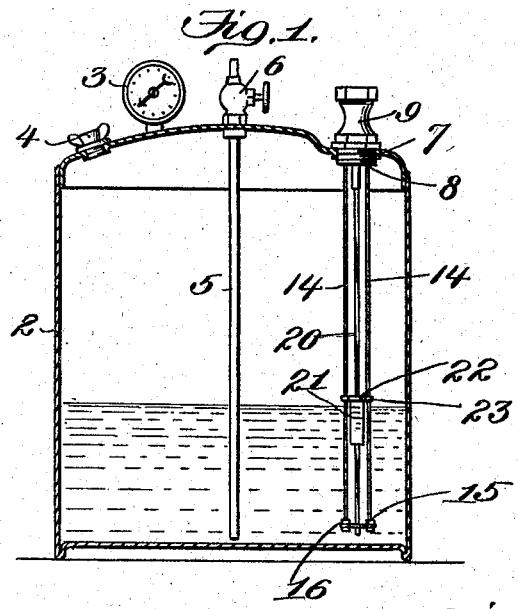
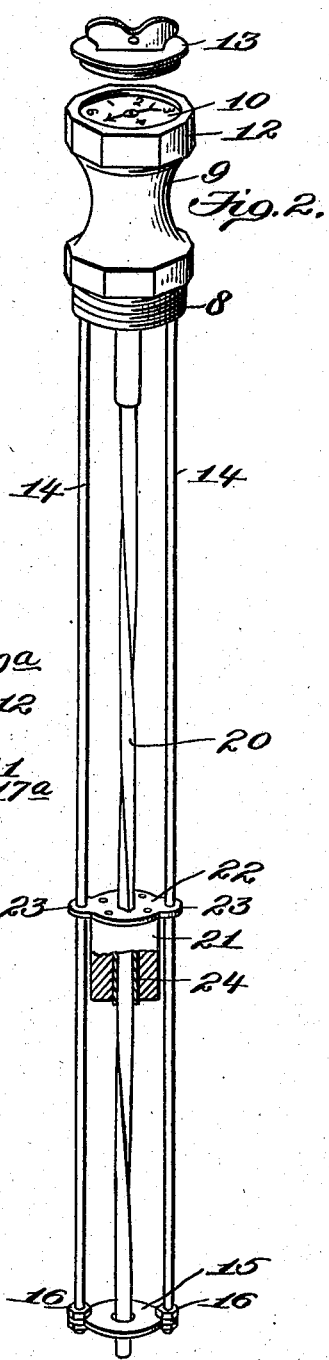
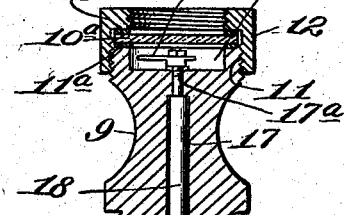
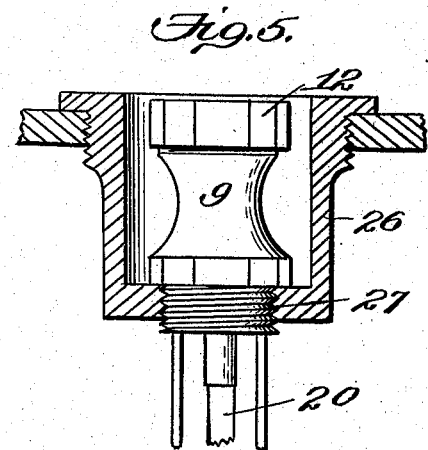
Witnesses:
Inventor
Julius B. Laursen
by James L. Norris

UNITED STATES PATENT OFFICE.

JULIUS B. LAURSEN, OF SORKNESS, NORTH DAKOTA.

INDICATOR FOR TANKS.

No. 885,059.　　Specification of Letters Patent.　　Patented April 21, 1908.

Application filed April 11, 1907. Serial No. 367,532.

*To all whom it may concern:*

Be it known that I, JULIUS B. LAURSEN, a citizen of the United States, residing at Sorkness, in the county of Ward and State of North Dakota, have invented new and useful Improvements in Indicators for Tanks, of which the following is a specification.

My invention relates to an indicator for use in connection with tanks for receiving gasolene, alcohol, or analogous liquids.

One object of the invention is the provision of means for indicating the amount of liquid contained in the tank.

Another object of the invention is the provision of means for connecting the indicator to a tank of air-tight construction.

A further object of the invention is the provision of means for positioning the indicator with respect to the tank so that the said indicator will not protrude to any great extent beyond the surface of the portion of the tank to which it is applied.

Other objects of the invention are simplicity of construction, efficiency of operation, durability and inexpensiveness of manufacture.

With these and other objects in view, the invention consists in the construction, combination and arrangement of parts as hereinafter referred to and as embodied in the accompanying drawings disclosing the preferred form of the invention. However, I desire it understood that I may make such changes, variations and modifications as come within the scope of the claims hereunto appended.

In the drawings:—Figure 1 is a sectional view of a tank and indicator applied thereto; Fig. 2 is a perspective view of the indicator detached from the tank; Fig. 3 is a detail view of the collar carried by the tank and for supporting the indicator; Fig. 4 is a detail view of the member; Fig. 5 is a modification of the collar and a portion of the indicator coupled therewith.

Similar reference characters indicate corresponding parts throughout the several views.

In the drawings the numeral 2 designates an air-tight tank which may be of any suitable material and of any desired construction; and in communication therewith is an air pressure gage 3 of the usual construction, the same forming no part of this invention. The tank 2 may be filled in any convenient manner; however, I have shown a removable plug 4 arranged at the top thereof, and leading from said tank is a piping 5 having a cut-off valve 6.

At a suitable locality in the tank is a threaded opening 7 for receiving an exteriorly and internally threaded collar 8, the latter receiving a member 9 having a circular recess 9ª for the reception of a dial 10, the latter having on its outer face a series of notations which may be varied at will. The upper portion of the member 9 is exteriorly screw threaded as at 11 to receive a threaded cap as 12, having a central circular opening, the inner wall of the latter being screw threaded to receive a stopper as 13. Intermediate the threaded cap 12 and the upper peripheral edge of the member 9 is a crystal 10ª, and at opposite sides of which are washers 11ª which are adapted to cushion the said crystal 10ª when the cap 12 is in position on the member 9. Said crystal 10ª is for the purpose of forming a transparent covering for the dial 10, and due to its particular mounting affords an air-tight and dust proof closure for the said dial, thus making it impossible for air or gas to escape even under high pressure through the member 9. Depending from the member 9 are guide rods 14 arranged in parallelism the latter carrying at their extremities a perforated plate 15 secured to the terminals of the guide rods 14 by nuts 16. Centrally of the member 9 is an opening 17 terminating at one end in a decreased opening 17ª; and mounted in the opening 17 is a rod 18 having threaded reduced ends 18ª, one of which is connected by a sleeve 19 to a spiral member 20, and the other end extending through the decreased opening 17ª and having connection with a pointer 20ª adapted to rotate over the dial 10 when the spiral member 20 is caused to move by a float 21 slidably mounted on said spiral member 20.

To position the spiral member 20 and to guide the float 21 a plate 22 is provided having extensions 23 in which are openings for receiving the guide rods 14; and said plate 22 has a depending sleeve 24 which is inserted in the opening in the float 21 to prevent the wearing of the material of the float as the latter is moved throughout the course of the spiral member 20, and to also relieve the friction incident to such movement. The said plate 22 slidably mounted on the guide rods 14 will prevent turning or displacement of the float 21 in its course of movement on the spiral member 20. It will be apparent that due to the particular coupling of the several parts the same can be detached and replaced at will.

In operation, the member 9 is secured to the collar 8 and the guide rods 14 depend interiorly of the tank 2. As the tank is filled with fluid the float 21 will follow the level thereof and by its movement will cause the spiral member 20 to rotate in the member 9, thereby moving the pointer 20ª over the face of the dial 10 until the tank has received the desired quantity of fluid, which will be determined by the indicating notations on the face of the dial. In drawing off the fluid from the tank, the float will move downwardly and operate the spiral member 20 and correspondingly actuate the pointer 20ª. By this means the quantity of fluid in the tank may always be reliably and accurately ascertained.

In Fig. 5 I have shown a slight modification of the construction of collar for receiving the member 9; and in this instance the collar is of cup-shaped form as at 26 having a central threaded opening 27 for receiving the member 9 so that the latter will not extend above the top of the tank to which the collar 26 may be applied.

Having thus described the invention, what is claimed is:

1. In a device of the class described, a dial receiving member having a central bore terminating at one end in a recess, a rod having threaded extremities rotatably mounted in the bore, a pointer engaging one of the threaded ends of the rod and adapted to rotate in the recess of the member, a float, means coöperative with the latter and the opposite end of the rod to actuate the same to move the pointer, a crystal mounted on said member above the recess therein, a detachable cap for securing the crystal in position on the member, and a removable stopper carried by the cap.

2. In a tank having a threaded opening, a removable cup shaped collar in threaded engagement with the threaded opening, a detachable dial receiving member mounted in said collar and having a central bore terminating in a recess at one end of the member, a dial having notations secured in the recess, a rod having opposite threaded ends rotatively mounted in the bore, a pointer in threaded engagement with one threaded end of the rod and adapted to rotate in the recess above the dial, a float member, means associated with the latter and having threaded connection with the opposite threaded end of the rod for rotating the same to cause the movement of the pointer when said float is caused to be lowered or elevated, said dial receiving member having in its outer face screw threads at one end thereof, a screw threaded cap in engagement with the threaded end of the member, and a crystal secured in position on the member above the recess by the collar.

3. In a tank having an opening, a dial receiving member mounted in the opening and having a central bore terminating at one end in a recess in said member, guide rods depending in parallelism from said member, a perforated plate mounted on the free terminals of said guide rods, nuts for locking the plate in position, a rod having oppositely threaded ends rotatively mounted in the bore of the member, a pointer movable in the recess and in threaded engagement with one end of the rod, a spiral member intermediate the guide rods, a threaded sleeve in engagement with the spiral member and the remaining threaded end of the rotatable rod for connecting said spiral member thereto, a float slidable on the spiral member, a plate having opposite extensions provided with openings secured to said float, the guide rods passing through the openings in the extensions for holding the float in position and to guide the same during its movement, a depending sleeve extending from said latter plate intermediate the spiral member and the float, a crystal mounted on the dial receiving member above the recess, and a detachable cap for holding the crystal in position on the member.

In testimony whereof I have hereunto set my hand in presence of two subscribing witnesses.

JULIUS B. LAURSEN.

Witnesses:
 OSCAR HAUGE,
 E. F. FISHER.